United States Patent [19]

Haack

[11] 3,810,638
[45] May 14, 1974

[54] WEIGHING APPARATUS
[75] Inventor: Werner Haack, Chur, Germany
[73] Assignee: Pfister Waagen GmbH, Augsburg, Germany
[22] Filed: Jan. 5, 1973
[21] Appl. No.: 321,542

[30] Foreign Application Priority Data
 Jan. 7, 1972 Germany.......................... 2200533

[52] U.S. Cl................. 177/213, 177/164, 177/176, 177/212, 177/214, 177/246, 177/249
[51] Int. Cl.... G01g 7/00, G01g 11/14, G01g 23/10
[58] Field of Search................ 177/1, 164, 213–215, 177/246, 249

[56] References Cited
UNITED STATES PATENTS
| | | | |
|---|---|---|---|
| 3,512,596 | 5/1970 | Haack | 177/213 |
| 3,055,444 | 9/1962 | Chyo | 177/213 |
| 1,773,570 | 8/1930 | Bryce | 177/214 |
| 2,825,548 | 3/1958 | De Haan | 177/249 |
| 3,011,573 | 12/1961 | Borzer | 177/213 |
| 2,756,041 | 7/1956 | Outrebon | 177/215 |
| 3,472,330 | 10/1969 | Hino | 177/214 |

FOREIGN PATENTS OR APPLICATIONS
| | | | |
|---|---|---|---|
| 196,527 | 4/1923 | Great Britain | 177/213 |
| 324,728 | 10/1957 | Switzerland | 177/213 |
| 1,109,233 | 1/1956 | France | 177/213 |

Primary Examiner—Richard B. Wilkinson
Assistant Examiner—Vit W. Miska
Attorney, Agent, or Firm—Eric H. Waters

[57] ABSTRACT

The poise of weighing apparatus is displaced by driving means if the weighing beam is not in the equilibrium position. A very small working force is sufficient to displace the poise because, in an embodiment in which the poise is guided so as to slide along a shaft, permanent relative rotation is maintained between poise and shaft, even in the equilibrium position of the poise. Either the shaft or the poise is constantly rotated. In an alternative embodiment, the poise together with at least one shaft forms one unit which is slidably and rotatably supported in bearing bushes, either the unit or the bearing bushes once again constantly rotated even when the driving means no longer produce any displacement of the poise.

7 Claims, 3 Drawing Figures

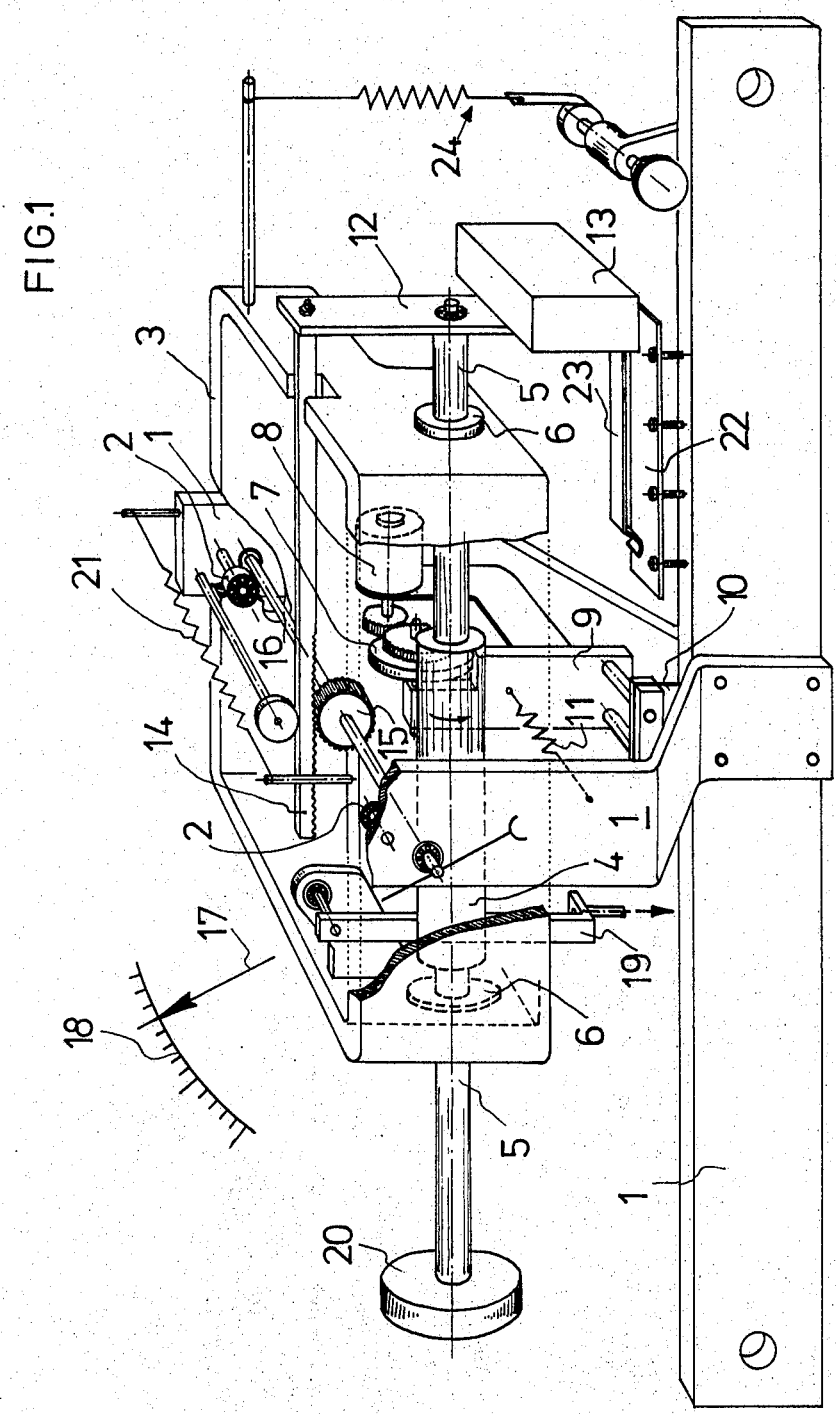

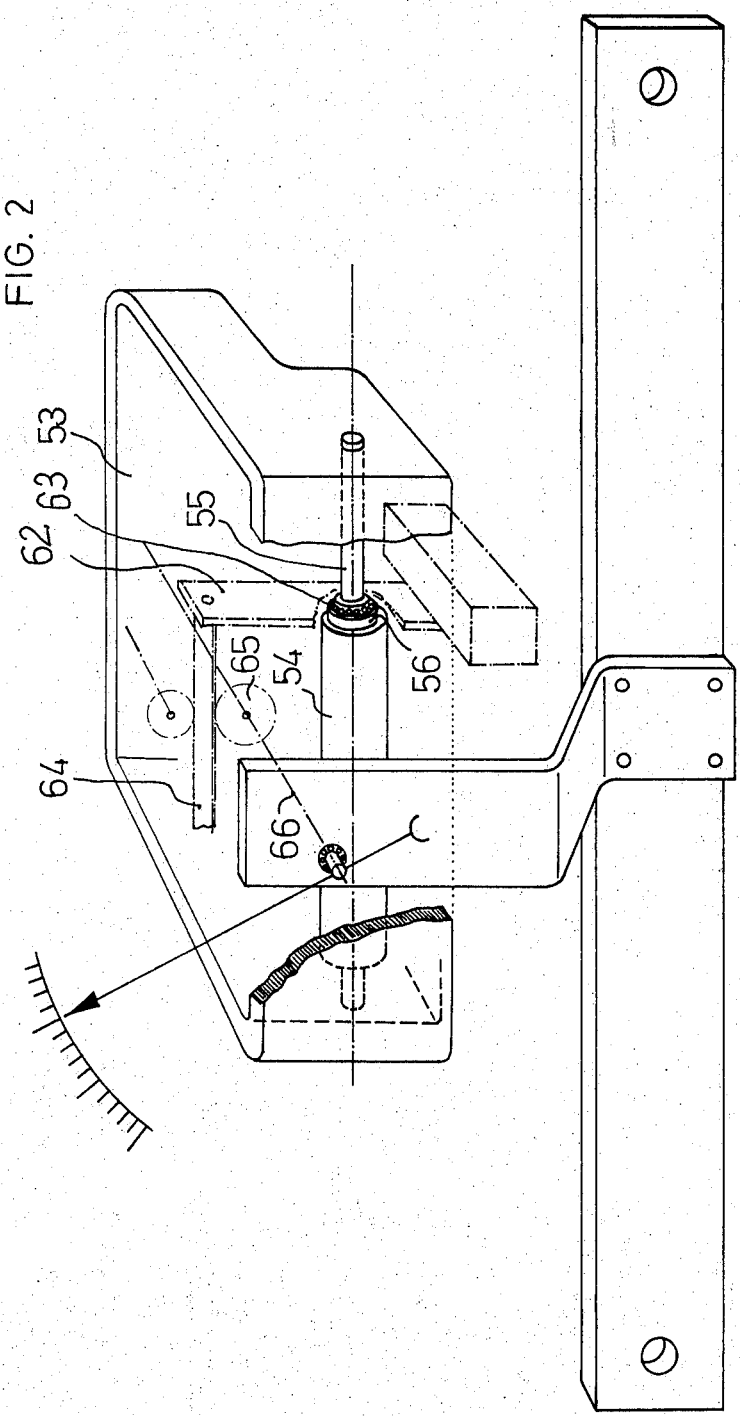

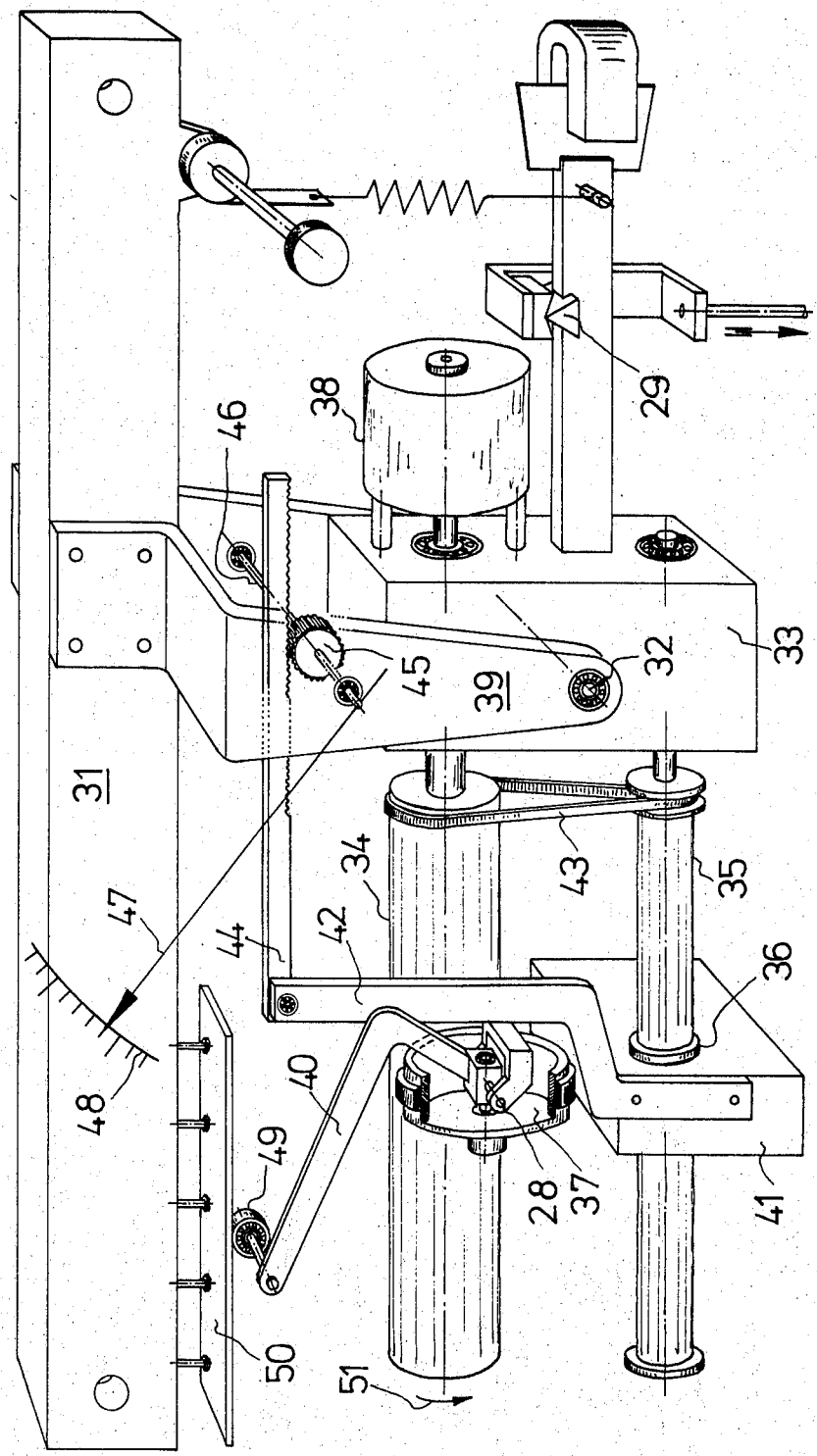

WEIGHING APPARATUS

The invention relates to weighing apparatus comprising a weighing beam which is pivotably supported in a stationary frame, rectilinear guiding means for guiding a poise on a rectilinear track, and driving means for traversing the poise.

It is a problem in such weighing machines to provide rectilinear guiding means which are as simple as possible, having maximum accuracy and requiring the least possible driving energy for traversing the poise. The prior art discloses weighing apparatus whose driving means comprise a friction drive which in its simplest form has a motor-driven friction roller along whose surface line a friction wheel is guided so as to be longitudinally slidable. At least the last mentioned friction wheel is supported on the weighing beam and represents at least part of the poise. When the weighing apparatus is in equilibrium, the axes of the friction roller and of the friction wheel are precisely parallel. Relative pivoting of the two friction elements occurs in the event of load changes. This relative pivoting motion ensures the application of a driving force component which moves the friction wheel along the friction roller. This driving force component must overcome the energy losses of the friction wheel due to friction force component acting in the guiding direction. Since the driving power of the friction wheel is limited, it is essential to ensure that the rectilinear guiding means are as free as possible of friction. The prior art discloses carriages which are provided with rollers and support the friction wheel and are adapted to traverse along rails or bars. In such systems, manufacturing costs are high and sensitivity to the ingress of dust is great. A pivoting lever system for guiding the friction wheel rectilinearly has provided advantages by reducing the effective frictional coefficient.

The present invention provides weighing apparatus comprising a stationary frame; a weighing beam pivotably supported by the frame; an elongate member mounted on the weighing beam; a poise mounted on the weighing beam, the poise being movable along a rectilinear path parallel to the longitudinal axis of the elongate member; means for moving the poise along the rectilinear path; and means for causing continual movement of the elongate member in a direction perpendicular to the rectilinear path, whereby frictional resistance to the movement of the poise along the path is reduced.

The elongate member may comprise a straight bar with a circular cylindrical external surface, in which case either the poise is slidably guided on the bar and relative motion is simultaneously maintained between poise and bar in a plane which is perpendicular to the sliding direction, or the poise and bar form a rigid unit which is slidably guided in a bearing on the weighing beam, permanent relative rotation being maintained at the same time between the bar and the bar bearing.

A straight bar basically represents the simplest rectilinear guiding means. However, it is unsuitable for a high degree of measuring accuracy even if the coefficients of friction are favourable. Constant rotation of the bar and/or of a bearing bush disposed on the bar achieves a sliding sensitivity which far exceeds that of known constructions. The sliding sensitivity may be influences not only by improving the frictional conditions but also by the shape of the velocity triangles and triangles of forces in the circumferential and longitudinal direction on the bearing positions. Furthermore, structural height and manufacturing effort are substantially reduced. The stick-slip effect which militates against rapid achievement of the equilibrium position, is avoided in a surprisingly simple manner.

The invention is of advantage wherever only low forces are available for sliding weights along a rectilinear path. Although this is the case more particularly in weighing apparatus of the kind described above in which the driving means comprise a friction drive which need not necessarily incorporate merely a friction roller and a friction wheel but may have any kind of friction elements such as friction collars, friction belts and the like, the invention may be applied to any kind of weighing apparatus of the kind described above, since it permits exceptionally accurate and loss-free rectilinear motion of poises while the manufacturing effort is minimised.

The invention will be described further, by way of example only, with reference to the accompanying drawings, in which:

FIG. 1 is a fragmentary perspective view of one form of weighing apparatus;

FIG. 2 is a similar view of a modified form of the apparatus of FIG. 1; and

FIG. 3 is a similar view of another form of weighing apparatus.

FIG. 1 shows a frame 1, fixed relative to a foundation, on which a weighing beam 3 is supported by means of pivoting bearings 2; a friction roller 4 has coaxial shafts 5 at its ends, the shafts being rotatably and slidably supported in bearing bushes 6 of the weighing beam 3. The friction roller 4 is driven through a friction wheel 7 by a motor 8. The friction wheel 7 and the motor 8 are disposed on a bearing block 9 which is mounted on the frame 1, so as to be pivotable about its horizontal longitudinal axis, by means of a spring plate 10; a spring 11 provides the contact pressure between the friction elements 4, 7. The geometrical plane containing the axes of pivoting bearings 2, 2 and extending perpendicularly to the axis of rotation of the friction roller 4 extends through the middle of the line of contact between the firction elements 4, 7.

A link 12 with a weight 13, which maintains the link 12 in the vertical position, is disposed by means of a ball bearing on the right-hand end of the shaft 5 which projects from the bearing 6. A gear track 14, mounted on the link 12, meshes with a pinion 15 which is mounted on a pointer spindle 16 of the frame 1, the spindle 16 carries a pointer 17 which indicates on a scale 18 the position of the friction roller 4, which corresponds to the load which acts on the link 19. A counter-weight 20 disposed on the end of the roller-shaft system 4, 5 which is opposite to the weight 13 ensures that the two bearings 6 are approximately equally loaded in the zero position of the roller. The force applied to the weighing beam 3 via the friction roller 4 by the friction wheel 7 (fixedly supported relative to the foundation) and applied axially to the pivoting bearings 2 is at least partially absorbed by a relief spring 21 which is provided between the weighing beam and the frame 1. A leaf spring 23, mounted on the weight 13, slides on an adjusting rail 22, which is screwed to the frame 1, to compensate for any errors of linearity. The numeral 24 refers to conventional taring means.

The method of operation is as follows: if the load on the link 19 is increased, the weighing beam 3 pivots anti-clockwise about the pivoting axis of the bearings 2, 2, where appropriate to a stop abutment which is not shown. Since the friction wheel 7 remains fixed and does not co-execute this pivoting motion, there will be relative pivoting motion between the friction wheel 7 and friction roller 4, resulting in a displacement of the friction roller 4 (together with the shaft 5 and the weights 13, 20) to the right in accordance with the direction of rotation of the friction elements until the new equilibrium position has been found in which the weighing beam 3 pivots back and parallelism of the axes of rotation of the friction elements 4, 7 is restored.

Since the roller 4 is constantly driven by the motor 8 via the friction wheel 7, the shafts 5 will accordingly also rotate continuously in the bearing bushes 6. The relative rotation between the shafts 5 and bearing bushes 6 avoids any form of adhesive friction, so that very small axial forces are sufficient in order to slide the shafts 5 with the roller 4.

The embodiment described above achieves a very compact construction. The distance between the bearing bushes 6 in the weighing beam 3 is at least equal to the sum of the length of the roller 4 and the required sliding travel.

A modification of the weighing apparatus of FIG. 1, is illustrated in FIG. 2 and shows only the components which differ with respect to FIG. 1. A continuous shaft 55 is non-rotatably mounted in the weighing beam 53. The roller 54 is supported on the shaft 55 in a rotatable and longitudinally slidable manner by using low-wear bearing bushes 56. Adhesive friction is also eliminated in this manner because of the constant rotation of the roller 54 relative to the shaft 55. A link 62, which is mounted on a ball bearing 63 of the roller 54 corresponds to the link 12 in FIG. 1 and rotates the pinion 65 of the pointer spindle 66 via the gear rack 64. By contrast to the embodiment illustrated in FIG. 1, this achieves the additional advantage that the shafts 5 no longer project on both sides beyond the weighing beam 3, so that space requirements are further reduced.

FIG. 3 illustrates a further embodiment of a weighing apparatus with a frame 31, fixed relative to the foundation; a bearing block 39 and a weighing beam 33 are supported in the frame 31 so as to pivot about the axis 32. The apparatus also includes a load knife edge 29 to which the load is applied; a friction roller 34 rotatably supported on the weighing beam and a directly coupled motor 38; a shaft 35 rotatably supported on the weighing beam 33 accurately parallel to the roller 34, the shaft being constantly rotated by the roller 34 via a belt 43; a bearing block 41 guided by means of a bearing bush on the bar 35 so as to be longitudinally slidable and rotatable relative to it; a supporting arm 42, mounted on the bearing block 41 and having a friction wheel 37 which is rotatable about an axis parallel to the axis of rotation of the friction roller 34 and which is pivotable about an axis 28 disposed perpendicularly to the former; a control arm 40 carrying a control roller 49, mounted on the friction wheel pivoting member, the control roller being on contact with a rail 50 which is adjustably mounted on the frame 31; and a gear rack 44 mounted on the supporting arm 42 and cooperating with a gear wheel 45, a pointer spindle 46, a pointer 47 and a scale 48, for indicating the weight.

In the event of the load being increased, the weighing beam 33 pivots in the clockwise direction. Due to its being supported via the control arm 40 by the rail 50, the friction wheel 37 performs an oppositely orientated pivoting motion about the axis 28. As a result of the working angle thus produced between the axes of rotation of the roller 34 and the friction wheel 37, an axially orientated driving force component is applied to the friction wheel to displace it to the left, together with the bearing block 41, the arm 42, and the gear rack 44, the rotation of the roller 34 being as indicated by the arrow 51; the friction wheel 37 and the roller 34 are in constant frictional engagement due to the eccentric arrangement of the centre of gravity of the bearing block 41 relative to the axis of the constantly rotating shaft 35. The constantly maintained relative rotation between the shaft 35 and the bearing block 41 ensures that the driving force required for the axial displacement of the bearing block is exceptionally small in order to rapidly approach with a high degree of accuracy the new equilibrium position in which the bearing block 41, at least partially functioning as a poise, has pivoted the weighing beam 33 back into the horizontal position and the axes of the two friction elements 34, 37 are once again parallel. The sliding travel of the bearing block 41 is a measure of the magnitude of the load disturbance, which is indicated by an angle of rotation of the pointer 47 on the scale 48.

I claim:

1. Weighing apparatus comprising a stationary frame; a weighing beam pivotably supported by the frame; a counterpoise; guiding means on said beam for guiding at least part of said counterpoise along a rectilinear path; and driving means for moving the counterpoise along said rectilinear path; said guiding means comprising a shaft of circular cross-section, the counterpoise and the shaft forming a rigid unit both longitudinally slidably and rotatably supported by a bearing on the weighing beam, and continual relative rotation being maintained between the shaft and the bearing.

2. Weighing apparatus as claimed in claim 1, comprising a motor-driven friction gear for moving said counterpoise along the rectilinear path; said friction gear including a frictional element two coaxially aligned extensions of said shaft protruding from opposite end faces of the frictional element; the shafts being slidably and rotatably supported in bearing bushes on the weighing beam.

3. Weighing apparatus as claimed in claim 2, said friction gear having two frictional elements, the pivot axis of the weighing beam lying in a geometric plane which extends at right angles to the rotational axes of the frictional elements and which passes through the mid-point of a line of contact between said frictional elements.

4. Weighing apparatus comprising a stationary frame; a weighing beam pivotably supported by the frame; a counterpoise; a guiding shaft on said beam of circular cross-section for guiding at least part of said counterpoise along a rectilinear path; and driving means for moving the counterpoise along said rectilinear path; the counterpoise being both longitudinally slidably and rotatably supported on said shaft, and continual relative rotation being maintained between the shaft and the counterpoise about an axis coinciding with the longitudinal axis of said shaft.

5. Weighing apparatus as claimed in claim 4, comprising a motor-driven friction gear for moving said counterpoise along the rectilinear path; said friction gear having a frictional element slidably and rotatably supported by said shaft, said shaft being fastened to the weighing beam.

6. Weighing apparatus as claimed in claim 4, comprising a motor-driven friction gear for moving said counterpoise along the rectilinear path; the shaft being rotatably supported on the weighing beam and continually driven; said friction gear having a frictional element being supported on a bearing block.

7. Weighing apparatus as claimed in claim 5, said friction gear having two frictional elements, the pivot axis of the weighing beam lying in a geometric plane which extends at right angles to the rotational axes of the frictional elements and which passes through the mid-point of a line of contact between said frictional elements.

* * * * *